United States Patent [19]
Schmersal

[11] Patent Number: 5,450,054
[45] Date of Patent: Sep. 12, 1995

[54] HAND-ACTUATABLE CONTROLLER AND METHOD FOR PRODUCING CONTROL SIGNALS USING THE SAME

[75] Inventor: Larry J. Schmersal, Aurona, Ohio

[73] Assignee: Imo Industries, Inc., Lawrenceville, N.J.

[21] Appl. No.: 304,087

[22] Filed: Sep. 9, 1994

Related U.S. Application Data

[63] Continuation of Ser. No. 986,825, Dec. 8, 1992.

[51] Int. Cl.$^6$ .................... H01C 10/16; H01L 43/00
[52] U.S. Cl. ............................. 338/128; 338/32 R; 338/32 H; 74/471 XY
[58] Field of Search .................... 338/128, 32 R, 32 H; 74/471 XY

[56] References Cited

U.S. PATENT DOCUMENTS

| | | | |
|---|---|---|---|
| 4,459,578 | 7/1984 | Sava et al. | 338/128 |
| 4,489,303 | 12/1984 | Martin | 338/128 |
| 4,490,710 | 12/1984 | Kopsho, Jr. et al. | 338/128 |
| 4,733,214 | 3/1988 | Andresen | 338/128 |
| 5,113,714 | 5/1992 | Eklund et al. | 74/471 XY |

OTHER PUBLICATIONS

"Powertrain Control Interface for Electronic Controls Used In Medium and Heavy Duty Diesel On-Highway Vehicle Applications", SAE Recommended Practice J1922, Draft Jul. 16, 1989.

"Future Transmissions: Here Today", *Electronics in Trucking,* by Kenneth Stadden, Technical Editor, Heavy Duty Trucking, Oct. 1989, pp. 114–119.

"New Machine Concepts: What Does the Future Hold?" by Pam Gruehnau, Managing Editor, Construction Equipment, *Fleet Management,* Apr. 1991, pp. 22–36.

"User-Friendly Electronic Powershift Transmission Controls" by Garth H. Bulgrien, SAE Technical Paper Series, SAE International, The Engineering Society for Advancing Mobility Land Sea Air and Space, International Off-Highway & Powerplant Congress and Exposition, Sep. 9–12, 1991, Milwaukee, Wisconsin, Paper No. 911831, Society of Automotive Engineers, Inc., pp. 9–11.

"Serial Data Communications Between Microcomputer Systems in Heavy Duty Vehicle Applications" *Truck and Bus Practice,* by SAE International (Society of Automotive Engineers, Inc.), The Engineering Society for Advancing Mobility Land Sea Air and Space, Submitted for recognition as an American National Standard, Pennsylvania, Issued–Jan. 1986; Revised–Nov. 1989 Revised–Aug. 1990; pp. 1–11.

"Those Smart Engines" by Murray Clifford, Truck Australia, Electronic Engines, Jan./Feb. 1991, pp. 16–21.

*Primary Examiner*—Marvin M. Lateef
*Attorney, Agent, or Firm*—Hopgood, Calimafde, Kalil & Judlowe

[57] ABSTRACT

A programmable hand-actuatable controller and method of producing control signals using same are disclosed. The programmable controller has a compact housing from which a rotatable shift lever extends. A twist grip type handle is rotatably mounted to the end portion of the shift lever. A flexible electronic circuit carrying Hall-effect sensor is affixed to the lever and is electrically interfaced with a signal processing module contained within the housing. Directional control signals are produced when shift lever is shifted to any of three detented positions about a first rotational axis for selections of forward, neutral, and reverse directions. Gear ratio control signals are produced for selection of various gear ratios when the handle is rotated to any of a plurality of detented positions about a second rotational axis disposed along the longitudinal extent of the lever. The controller of the present invention is inexpensive to manufacture, uses a minimal number of moving parts, and can be easily programmed for controlling diverse types of machines.

14 Claims, 8 Drawing Sheets

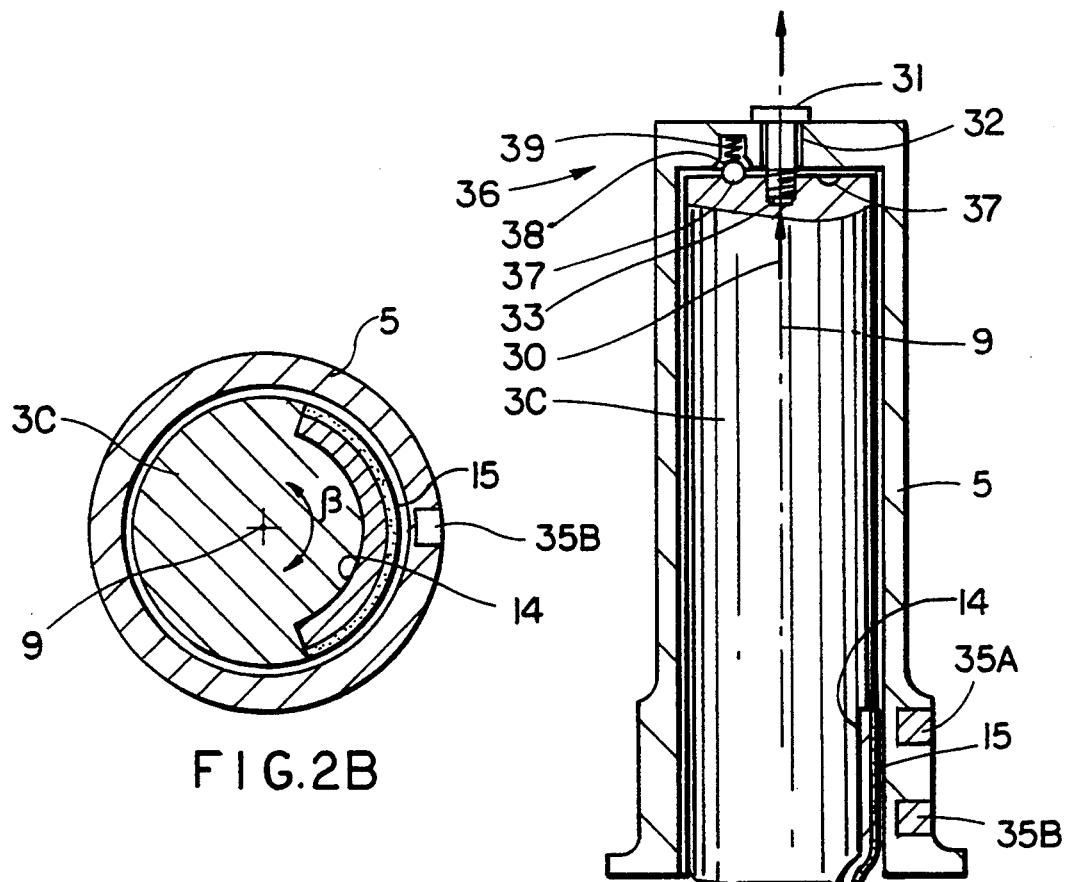
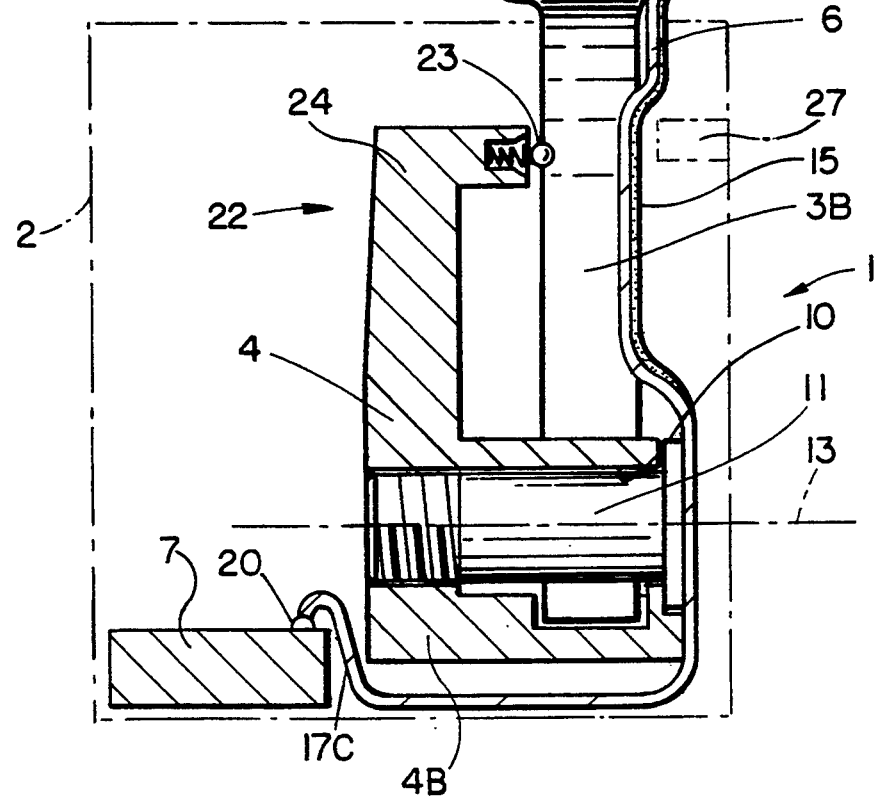
FIG. 2B
FIG. 2A

| INPUT | | | | | | | | OUTPUT | | | | | | | | |
|---|---|---|---|---|---|---|---|---|---|---|---|---|---|---|---|---|
| HF | HN | HR | H1 | H2 | H3 | H4 | H5 | OF | ON | OR | 01 | 02 | 03 | 04 | 05 | HLD |
| 0 | 1 | 0 | 0 | 0 | 0 | 0 | 0 | 0 | 1 | 0 | 0 | 0 | 0 | 0 | 0 | 1 |
| 0 | 1 | 0 | 1 | 0 | 0 | 0 | 0 | 0 | 1 | 0 | 0 | 0 | 0 | 0 | 0 | 0 |
| 0 | 1 | 0 | 0 | 1 | 0 | 0 | 0 | 0 | 1 | 0 | 0 | 0 | 0 | 0 | 0 | 0 |
| 0 | 1 | 0 | 1 | 1 | 0 | 0 | 0 | 0 | 1 | 0 | 0 | 0 | 0 | 0 | 0 | 1 |
| 0 | 1 | 0 | 0 | 0 | 1 | 0 | 0 | 0 | 1 | 0 | 0 | 0 | 0 | 0 | 0 | 0 |
| 0 | 1 | 0 | 1 | 0 | 1 | 0 | 0 | 0 | 1 | 0 | 0 | 0 | 0 | 0 | 0 | 1 |
| 0 | 1 | 0 | 0 | 1 | 1 | 0 | 0 | 0 | 1 | 0 | 0 | 0 | 0 | 0 | 0 | 1 |
| 0 | 1 | 0 | 1 | 1 | 1 | 0 | 0 | 0 | 1 | 0 | 0 | 0 | 0 | 0 | 0 | 1 |
| 0 | 1 | 0 | 0 | 0 | 0 | 1 | 0 | 0 | 1 | 0 | 0 | 0 | 0 | 0 | 0 | 0 |
| 0 | 1 | 0 | 1 | 0 | 0 | 1 | 0 | 0 | 1 | 0 | 0 | 0 | 0 | 0 | 0 | 1 |
| 0 | 1 | 0 | 0 | 1 | 0 | 1 | 0 | 0 | 1 | 0 | 0 | 0 | 0 | 0 | 0 | 1 |
| 0 | 1 | 0 | 1 | 1 | 0 | 1 | 0 | 0 | 1 | 0 | 0 | 0 | 0 | 0 | 0 | 1 |
| 0 | 1 | 0 | 0 | 0 | 1 | 1 | 0 | 0 | 1 | 0 | 0 | 0 | 0 | 0 | 0 | 1 |
| 0 | 1 | 0 | 1 | 0 | 1 | 1 | 0 | 0 | 1 | 0 | 0 | 0 | 0 | 0 | 0 | 1 |
| 0 | 1 | 0 | 0 | 1 | 1 | 1 | 0 | 0 | 1 | 0 | 0 | 0 | 0 | 0 | 0 | 1 |
| 0 | 1 | 0 | 1 | 1 | 1 | 1 | 0 | 0 | 1 | 0 | 0 | 0 | 0 | 0 | 0 | 1 |
| 0 | 1 | 0 | 0 | 0 | 0 | 0 | 1 | 0 | 1 | 0 | 0 | 0 | 0 | 0 | 0 | 0 |
| 0 | 1 | 0 | 1 | 0 | 0 | 0 | 1 | 0 | 1 | 0 | 0 | 0 | 0 | 0 | 0 | 1 |
| 0 | 1 | 0 | 0 | 1 | 0 | 0 | 1 | 0 | 1 | 0 | 0 | 0 | 0 | 0 | 0 | 1 |
| 0 | 1 | 0 | 1 | 1 | 0 | 0 | 1 | 0 | 1 | 0 | 0 | 0 | 0 | 0 | 0 | 1 |
| 0 | 1 | 0 | 0 | 0 | 1 | 0 | 1 | 0 | 1 | 0 | 0 | 0 | 0 | 0 | 0 | 1 |
| 0 | 1 | 0 | 1 | 0 | 1 | 0 | 1 | 0 | 1 | 0 | 0 | 0 | 0 | 0 | 0 | 1 |
| 0 | 1 | 0 | 0 | 1 | 1 | 0 | 1 | 0 | 1 | 0 | 0 | 0 | 0 | 0 | 0 | 1 |
| 0 | 1 | 0 | 1 | 1 | 1 | 0 | 1 | 0 | 1 | 0 | 0 | 0 | 0 | 0 | 0 | 1 |
| 0 | 1 | 0 | 0 | 0 | 0 | 1 | 1 | 0 | 1 | 0 | 0 | 0 | 0 | 0 | 0 | 1 |
| 0 | 1 | 0 | 1 | 0 | 0 | 1 | 1 | 0 | 1 | 0 | 0 | 0 | 0 | 0 | 0 | 1 |
| 0 | 1 | 0 | 0 | 1 | 0 | 1 | 1 | 0 | 1 | 0 | 0 | 0 | 0 | 0 | 0 | 1 |
| 0 | 1 | 0 | 1 | 1 | 0 | 1 | 1 | 0 | 1 | 0 | 0 | 0 | 0 | 0 | 0 | 1 |
| 0 | 1 | 0 | 0 | 0 | 1 | 1 | 1 | 0 | 1 | 0 | 0 | 0 | 0 | 0 | 0 | 1 |
| 0 | 1 | 0 | 1 | 0 | 1 | 1 | 1 | 0 | 1 | 0 | 0 | 0 | 0 | 0 | 0 | 1 |
| 0 | 1 | 0 | 0 | 1 | 1 | 1 | 1 | 0 | 1 | 0 | 0 | 0 | 0 | 0 | 0 | 1 |
| 0 | 1 | 0 | 1 | 1 | 1 | 1 | 1 | 0 | 1 | 0 | 0 | 0 | 0 | 0 | 0 | 1 |
| 1 | 0 | 0 | 0 | 0 | 0 | 0 | 0 | 1 | 0 | 0 | 0 | 0 | 0 | 0 | 0 | 1 |
| 1 | 0 | 0 | 1 | 0 | 0 | 0 | 0 | 1 | 0 | 0 | 1 | 0 | 0 | 0 | 0 | 0 |
| 1 | 0 | 0 | 0 | 1 | 0 | 0 | 0 | 1 | 0 | 0 | 0 | 1 | 0 | 0 | 0 | 0 |
| 1 | 0 | 0 | 1 | 1 | 0 | 0 | 0 | 1 | 0 | 0 | 0 | 0 | 0 | 0 | 0 | 1 |
| 1 | 0 | 0 | 0 | 0 | 1 | 0 | 0 | 1 | 0 | 0 | 0 | 0 | 1 | 0 | 0 | 0 |
| 1 | 0 | 0 | 1 | 0 | 1 | 0 | 0 | 1 | 0 | 0 | 0 | 0 | 0 | 0 | 0 | 1 |
| 1 | 0 | 0 | 0 | 1 | 1 | 0 | 0 | 1 | 0 | 0 | 0 | 0 | 0 | 0 | 0 | 1 |
| 1 | 0 | 0 | 1 | 1 | 1 | 0 | 0 | 1 | 0 | 0 | 0 | 0 | 0 | 0 | 0 | 1 |
| 1 | 0 | 0 | 0 | 0 | 0 | 1 | 0 | 1 | 0 | 0 | 0 | 0 | 0 | 1 | 0 | 0 |
| 1 | 0 | 0 | 1 | 0 | 0 | 1 | 0 | 1 | 0 | 0 | 0 | 0 | 0 | 0 | 0 | 1 |
| 1 | 0 | 0 | 0 | 1 | 0 | 1 | 0 | 1 | 0 | 0 | 0 | 0 | 0 | 0 | 0 | 1 |
| 1 | 0 | 0 | 1 | 1 | 0 | 1 | 0 | 1 | 0 | 0 | 0 | 0 | 0 | 0 | 0 | 1 |
| 1 | 0 | 0 | 0 | 0 | 1 | 1 | 0 | 1 | 0 | 0 | 0 | 0 | 0 | 0 | 0 | 1 |
| 1 | 0 | 0 | 1 | 0 | 1 | 1 | 0 | 1 | 0 | 0 | 0 | 0 | 0 | 0 | 0 | 1 |
| 1 | 0 | 0 | 0 | 1 | 1 | 1 | 0 | 1 | 0 | 0 | 0 | 0 | 0 | 0 | 0 | 1 |

FIG. 4A

Left table:

| | | | | | | | |
|---|---|---|---|---|---|---|---|
| 1 | 0 | 0 | 1 | 1 | 1 | 1 | 0 |
| 1 | 0 | 0 | 0 | 0 | 0 | 0 | 1 |
| 1 | 0 | 0 | 1 | 0 | 0 | 0 | 1 |
| 1 | 0 | 0 | 0 | 1 | 0 | 0 | 1 |
| 1 | 0 | 0 | 1 | 1 | 0 | 0 | 1 |
| 1 | 0 | 0 | 0 | 0 | 1 | 0 | 1 |
| 1 | 0 | 0 | 1 | 0 | 1 | 0 | 1 |
| 1 | 0 | 0 | 0 | 1 | 1 | 0 | 1 |
| 1 | 0 | 0 | 1 | 1 | 1 | 0 | 1 |
| 1 | 0 | 0 | 0 | 0 | 0 | 1 | 1 |
| 1 | 0 | 0 | 1 | 0 | 0 | 1 | 1 |
| 1 | 0 | 0 | 0 | 1 | 0 | 1 | 1 |
| 1 | 0 | 0 | 1 | 1 | 0 | 1 | 1 |
| 1 | 0 | 0 | 0 | 0 | 1 | 1 | 1 |
| 1 | 0 | 0 | 1 | 0 | 1 | 1 | 1 |
| 1 | 0 | 0 | 0 | 1 | 1 | 1 | 1 |
| 1 | 0 | 0 | 1 | 1 | 1 | 1 | 1 |
| 0 | 0 | 1 | 0 | 0 | 0 | 0 | 0 |
| 0 | 0 | 1 | 1 | 0 | 0 | 0 | 0 |
| 0 | 0 | 1 | 0 | 1 | 0 | 0 | 0 |
| 0 | 0 | 1 | 1 | 1 | 0 | 0 | 0 |
| 0 | 0 | 1 | 0 | 0 | 1 | 0 | 0 |
| 0 | 0 | 1 | 1 | 0 | 1 | 0 | 0 |
| 0 | 0 | 1 | 0 | 1 | 1 | 0 | 0 |
| 0 | 0 | 1 | 1 | 1 | 1 | 0 | 0 |
| 0 | 0 | 1 | 0 | 0 | 0 | 1 | 0 |
| 0 | 0 | 1 | 1 | 0 | 0 | 1 | 0 |
| 0 | 0 | 1 | 0 | 1 | 0 | 1 | 0 |
| 0 | 0 | 1 | 1 | 1 | 0 | 1 | 0 |
| 0 | 0 | 1 | 0 | 0 | 1 | 1 | 0 |
| 0 | 0 | 1 | 1 | 0 | 1 | 1 | 0 |
| 0 | 0 | 1 | 0 | 1 | 1 | 1 | 0 |
| 0 | 0 | 1 | 1 | 1 | 1 | 1 | 0 |
| 0 | 0 | 1 | 0 | 0 | 0 | 0 | 1 |
| 0 | 0 | 1 | 1 | 0 | 0 | 0 | 1 |
| 0 | 0 | 1 | 0 | 1 | 0 | 0 | 1 |
| 0 | 0 | 1 | 1 | 1 | 0 | 0 | 1 |
| 0 | 0 | 1 | 0 | 0 | 1 | 0 | 1 |
| 0 | 0 | 1 | 1 | 0 | 1 | 0 | 1 |
| 0 | 0 | 1 | 0 | 1 | 1 | 0 | 1 |
| 0 | 0 | 1 | 1 | 1 | 1 | 0 | 1 |
| 0 | 0 | 1 | 0 | 0 | 0 | 1 | 1 |
| 0 | 0 | 1 | 1 | 0 | 0 | 1 | 1 |
| 0 | 0 | 1 | 0 | 1 | 0 | 1 | 1 |
| 0 | 0 | 1 | 1 | 1 | 0 | 1 | 1 |
| 0 | 0 | 1 | 0 | 0 | 1 | 1 | 1 |
| 0 | 0 | 1 | 1 | 0 | 1 | 1 | 1 |
| 0 | 0 | 1 | 0 | 1 | 1 | 1 | 1 |
| 0 | 0 | 1 | 1 | 1 | 1 | 1 | 1 |

Right table:

| | | | | | | | | |
|---|---|---|---|---|---|---|---|---|
| 1 | 0 | 0 | 0 | 0 | 0 | 0 | 0 | 1 |
| 1 | 0 | 0 | 0 | 0 | 0 | 0 | 1 | 0 |
| 1 | 0 | 0 | 0 | 0 | 0 | 0 | 0 | 1 |
| 1 | 0 | 0 | 0 | 0 | 0 | 0 | 0 | 1 |
| 1 | 0 | 0 | 0 | 0 | 0 | 0 | 0 | 1 |
| 1 | 0 | 0 | 0 | 0 | 0 | 0 | 0 | 1 |
| 1 | 0 | 0 | 0 | 0 | 0 | 0 | 0 | 1 |
| 1 | 0 | 0 | 0 | 0 | 0 | 0 | 0 | 1 |
| 1 | 0 | 0 | 0 | 0 | 0 | 0 | 0 | 1 |
| 1 | 0 | 0 | 0 | 0 | 0 | 0 | 0 | 1 |
| 1 | 0 | 0 | 0 | 0 | 0 | 0 | 0 | 1 |
| 1 | 0 | 0 | 0 | 0 | 0 | 0 | 0 | 1 |
| 1 | 0 | 0 | 0 | 0 | 0 | 0 | 0 | 1 |
| 1 | 0 | 0 | 0 | 0 | 0 | 0 | 0 | 1 |
| 1 | 0 | 0 | 0 | 0 | 0 | 0 | 0 | 1 |
| 1 | 0 | 0 | 0 | 0 | 0 | 0 | 0 | 1 |
| 1 | 0 | 0 | 0 | 0 | 0 | 0 | 0 | 1 |
| 0 | 0 | 1 | 0 | 0 | 0 | 0 | 0 | 1 |
| 0 | 0 | 1 | 1 | 0 | 0 | 0 | 0 | 0 |
| 0 | 0 | 1 | 0 | 1 | 0 | 0 | 0 | 0 |
| 0 | 0 | 1 | 0 | 0 | 0 | 0 | 0 | 1 |
| 0 | 0 | 1 | 0 | 0 | 1 | 0 | 0 | 0 |
| 0 | 0 | 1 | 0 | 0 | 0 | 0 | 0 | 1 |
| 0 | 0 | 1 | 0 | 0 | 0 | 0 | 0 | 1 |
| 0 | 0 | 1 | 0 | 0 | 0 | 0 | 0 | 1 |
| 0 | 0 | 1 | 0 | 0 | 0 | 1 | 0 | 0 |
| 0 | 0 | 1 | 0 | 0 | 0 | 0 | 0 | 1 |
| 0 | 0 | 1 | 0 | 0 | 0 | 0 | 0 | 1 |
| 0 | 0 | 1 | 0 | 0 | 0 | 0 | 0 | 1 |
| 0 | 0 | 1 | 0 | 0 | 0 | 0 | 0 | 1 |
| 0 | 0 | 1 | 0 | 0 | 0 | 0 | 0 | 1 |
| 0 | 0 | 1 | 0 | 0 | 0 | 0 | 0 | 1 |
| 0 | 0 | 1 | 0 | 0 | 0 | 0 | 0 | 1 |
| 0 | 0 | 1 | 0 | 0 | 0 | 0 | 1 | 0 |
| 0 | 0 | 1 | 0 | 0 | 0 | 0 | 0 | 1 |
| 0 | 0 | 1 | 0 | 0 | 0 | 0 | 0 | 1 |
| 0 | 0 | 1 | 0 | 0 | 0 | 0 | 0 | 1 |
| 0 | 0 | 1 | 0 | 0 | 0 | 0 | 0 | 1 |
| 0 | 0 | 1 | 0 | 0 | 0 | 0 | 0 | 1 |
| 0 | 0 | 1 | 0 | 0 | 0 | 0 | 0 | 1 |
| 0 | 0 | 1 | 0 | 0 | 0 | 0 | 0 | 1 |
| 0 | 0 | 1 | 0 | 0 | 0 | 0 | 0 | 1 |
| 0 | 0 | 1 | 0 | 0 | 0 | 0 | 0 | 1 |
| 0 | 0 | 1 | 0 | 0 | 0 | 0 | 0 | 1 |
| 0 | 0 | 1 | 0 | 0 | 0 | 0 | 0 | 1 |
| 0 | 0 | 1 | 0 | 0 | 0 | 0 | 0 | 1 |
| 0 | 0 | 1 | 0 | 0 | 0 | 0 | 0 | 1 |
| 0 | 0 | 1 | 0 | 0 | 0 | 0 | 0 | 1 |
| 0 | 0 | 1 | 0 | 0 | 0 | 0 | 0 | 1 |

FIG. 4B

HAND-ACTUATABLE CONTROLLER AND METHOD FOR PRODUCING CONTROL SIGNALS USING THE SAME

This is a continuation of copending application Ser. No. 07/986,825 filed on Dec. 8, 1992.

BACKGROUND OF INVENTION

1. Field of Invention

The present invention relates to a method and apparatus for producing control signals which can be used to control various types of equipment in work or recreational environments.

2. Brief Description of the Prior Art

The use of hand-actuable controllers to control equipment, such as transmissions, is well known in the art.

One Exemplary prior art controller is disclosed in the paper "User-Friendly Electronic Power Shift Transmission Controls" by Garth H. Bulgrien, SAE Technical Paper No. 911831, September, 1991. This controller employs a single shift lever assembly, a 16-bit microprocessor, random access memory, read only memory for storing a transmission control program, and an LCD indicator for visually indicating forward, neutral, and reverse directions, and gear ratios 1 through 18 selected by the operator. The transmission control program in this prior art controller generates controls signals for solenoid values which control multi-disc hydraulic clutches in the power-shift transmission. The design of the power-shift transmission provides 18 forward and 9 reverse gear ratios. The single shift lever is used to select all 27 transmissions ratios and has detented forward, neutral, and reverse positions. In each of these three positions, the lever can be moved to momentary upshift and down shift positions. In addition, there is a neutral latch which is released by raising a collar under the shift knob.

Prior art controllers of the type described above use conventional electro-mechanical switches to detect the various control positions manually selected by the operator. While highly functional, these electro-mechanical switches have less than optional reliability and an operational life commonly limited to one or two million cycles. As these devices are generally difficult and expensive to electrically interface, it is difficult to automatically detect their malfunction. Also, due to the large number of electro-mechanical switches required in any particular application, such prior art controllers have been inherently expensive to manufacture.

In order to overcome the above-described drawbacks associated with prior art controllers, the I-MAXX, ELECTRO-MAXX, and MORSE TCU brand controllers from IMO Industries each utilize Hall-effect sensing technology in lieu of conventional electro-mechanical switches. While these prior art controllers can be adapted to control various types of transmissions, the movement of their shift levers is limited to a single axis for the purpose of selecting forward, neutral and reverse directions and gear ratios. When provided with five or more forward and/or reverse gear ratio selections, a controller of this type requires extensive shift lever movement which can often cause operator fatigue over prolong periods of use.

Thus, there is a great need in the art for an improved method of producing control signals from a compact, hand-actuable controller which is reliable, programmable, and permits selection of a relatively large number of forward and reverse gear ratios in a safe manner, while minimizing hand movement operations.

OBJECTS AND SUMMARY OF THE PRESENT INVENTIONS

Accordingly, it is a primary object of the present invention to provide a method and apparatus for producing control signals for use in controlling equipment without the shortcomings and drawbacks associated with prior art methodologies and equipment.

A further object of the present invention is to provide such apparatus in the form of a compact, highly reliable programmable controller having a hand-actuable control shifting mechanism with two independent axes of rotation for the selection of multiple forward and reverse transmission gear ratios, in a safe and hand-motion saving manner.

A further object of the present invention is to provide a method of producing equipment control signals using such a hand-actuable controller.

A further object of the present invention is to provide such a hand-actuable controller, in which (i) forward, neutral and reverse direction control signals are automatically generated by rotating a lever to first, second and third rotational positions about a first axis of rotation, and (ii) any desired set of transmission gear ratio control signals for forward and reverse directions are automatically generated by rotating a lever supported handle to a predetermined rotational position about a second axis of rotation disposed along the longitudinal extent of the lever.

An even further object of the present invention is to provide such a hand-actuable controller, in which the selected rotational positions about the first and second axes of rotation are sensed using Hall-effect type magnetic flux sensors mounted on a flexible printed circuit that is permanently installed on the rotatable lever.

An even further object of the present invention is to provide such a hand-actuable controller, which utilizes a microprocessor and a control program stored in associated memory within a compact housing, for the purpose of decoding the sensed rotational positions of the lever and handle about the first and second axes of rotation, respectively, and producing suitable control signals for use in controlling equipment interfaced with the controller.

An even further object of the present invention is to provide such a hand-actuable controller, which can be readily adapted to control solenoid-actuated transmissions, electronically (i.e. logic level) controlled transmissions, and data communication-interfaced transmissions.

An even further object of the present invention is to provide such a hand-actuable controller, which is adapted to receive external input signals indicative of various control transmission parameters, including engine RPM, ground speed, and switch positions.

An even further object of the present invention is to provide such a hand-actuable controller, in which all components are contained within a rugged compact housing that can be mounted in virtually any desired position within a work or recreational environment.

These and other objects of the present invention will become apparent hereinafter.

BRIEF DESCRIPTION OF THE DRAWINGS

For a more complete understanding of the objects of the present invention, the Detailed Description of the Illustrated Embodiment is to be taken in connection with the following drawings in which:

FIG. 2A is an elevated, cross-sectional view of the programmable controller of the present invention, taken along line 2A—2A of FIG. 2;

FIG. 2B is a cross-sectional view of the handle of the programmable controller of the present invention, taken along time 2B—2B of FIG. 2;

FIG. 4 is a decode table used by the microprocessor in order to generate direction and gear ratio type control signals by decoding the logical input signals produced by the Hall-effect sensors mounted on the lever;

DETAILED DESCRIPTION OF THE ILLUSTRATIVE EMBODIMENT OF THE PRESENT INVENTION

Referring to FIGS. 1 through 6B, the structure function and operation of the programmable controller of the present invention will be described in detail.

Figure 1:
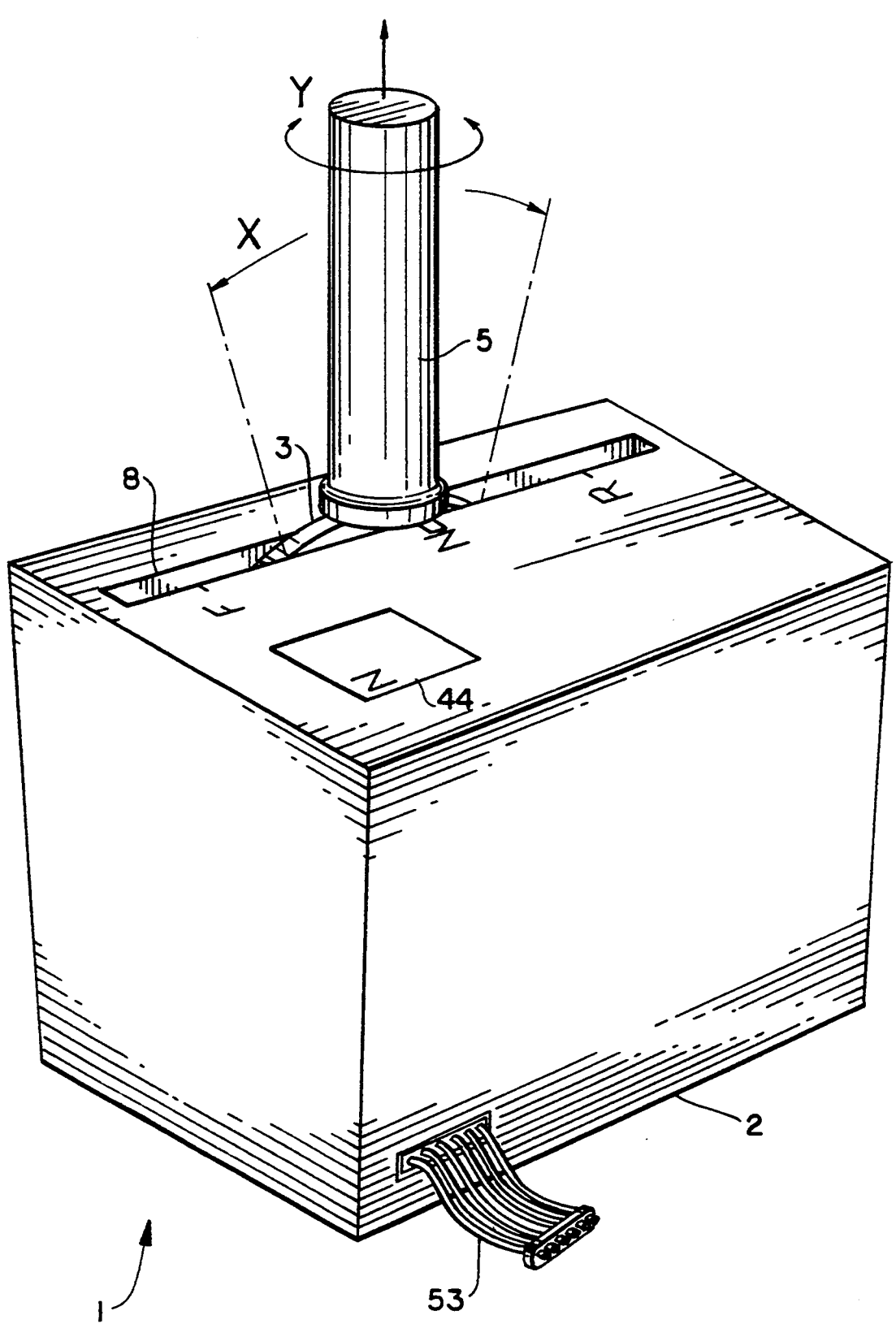
FIG. 1 is a perspective view of the hand-actuable programmable controller of the present invention.

As illustrated in FIGS. 1 and 2A, programmable controller 1 comprises an assembly of components, namely; a compact housing 2; a hand-actuable shift lever 3; a lever support mechanism 4 mounted within the housing; a twist-grip type handle 5; a flexible printed circuit 6; and a signal processing module 7. While compact housing 2 of the illustrative embodiment has an interior volume of rectangular geometry, it is understood that the shape of the compact housing may vary from embodiment to embodiment. Preferably, the housing is made from a high impact plastic or die cast metal which can withstand expected forces arising in its intended work or recreational environment. As best shown in FIG. 1, a longitudinally extending aperture 8 is formed in the upper panel of the compact housing in order to permit upper portion of the lever to extend from the housing interior and undergo rotation along the aperture in a manner which will be described in greater detail hereinafter.

As illustrated, lever 3 has a generally flat lower end portion 3A, a generally flat central portion 3B, and a substantially cylindrical upper end portion 3C, which are integrally connected and extend along longitudinal axis 9 of the lever. Lower end portion 3A of the lever has a transverse bore 10 formed therethrough, whereas central portion 3B has a flat central surface symmetrically extending about the longitudinal axis of the lever. The lever, preferably formed from a high strength material, is rotatably supported at its lower end portion by a shaft 11 which passes through bore 10 and an associated bearing assembly (not shown). These components are fixedly retained in a support base 12 securely attached to the bottom panel of the housing. In this way, the lever is rotatable about a first axis of rotation 13 which is coaxially aligned with the central axis of shaft. While not shown, the rotation of the lever about axis 13 is generally bounded by a shift lever delimiting mechanism. In the drawings, this range of lever rotation is indicated by "X" and in the illustrative embodiment extends ±15° about a vertical axis which is orthogonal to the top surface of the housing at the neutral position N. As illustrated, forward (F), neutral (N) and reverse (R) control directions are indicated at three discrete rotational positions within this range. As will be described in greater detail hereinafter, the lever includes a mechanism for detenting these three directional shift positions.

As shown in FIG. 2A, the upper cylindrical end portion of the lever extends above the top panel of the housing and has a surface recess 14 which extends about a third or more about of the lower section of this portion of the lever. Within this surface recess and over the flat surface of the central portion of the lever, flexible printed circuit 6 is affixed with suitable adhesive, and thereafter covered with an epoxy-based potting compound 15, in a manner known in electronic packaging art. Notably, the depth of surface recess 14 is greater than the thickness of the flexible electronic circuit so that when potting compound covers the upper portion of the flexible printed circuit in the surface recess, the resulting surface will be substantially cylindrical, consistent with the balance of the cylindrical end portion of the lever.

Figure 2:
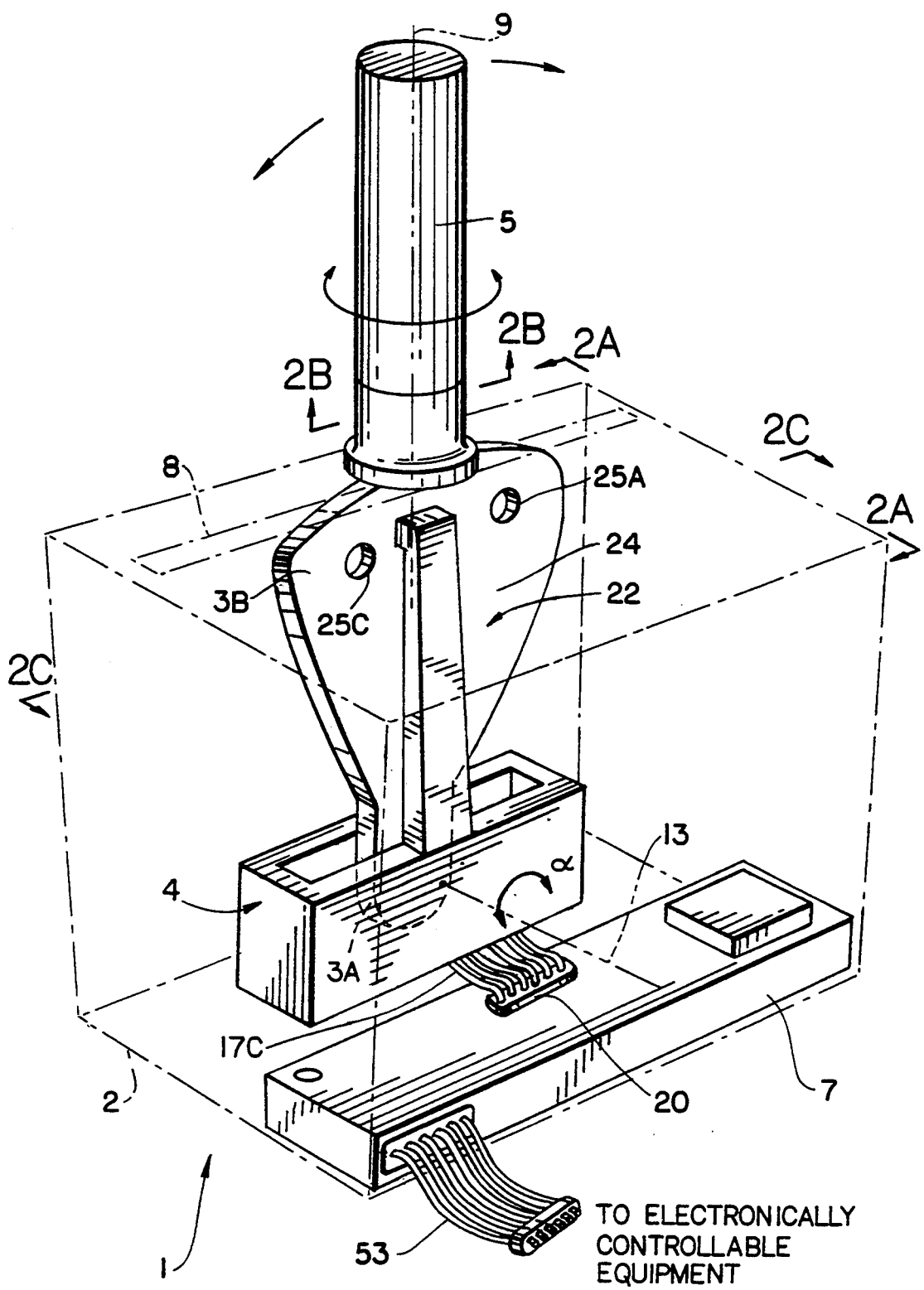
FIG. 2 is partially phantom, perspective view of the programmable controller of the present invention, showing the lever, lever support mechanism, handle, and electronic components contained within the compact housing of the controller.
Figure 2C:
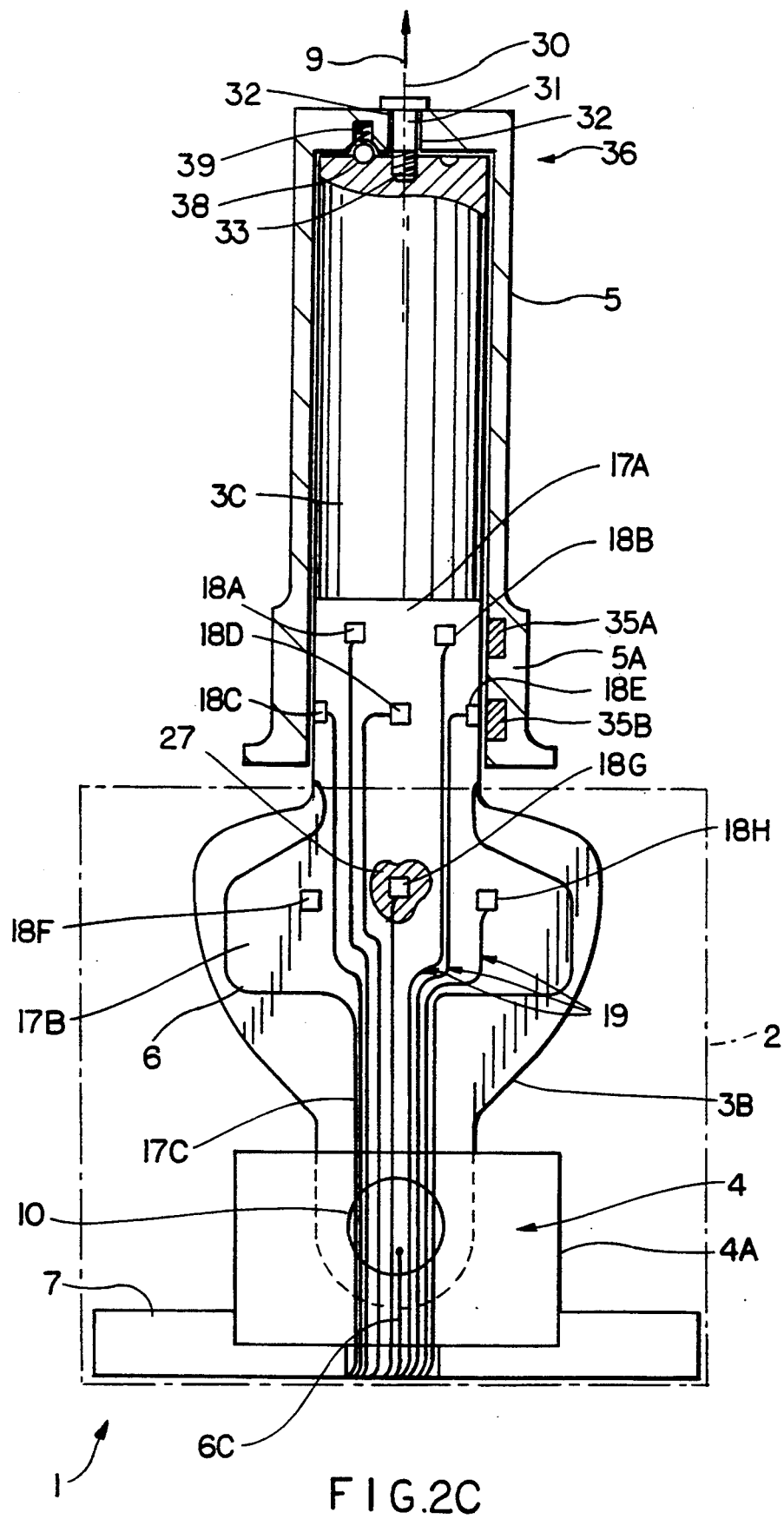
FIG. 2C is an elevated, cross-sectional view of the programmable controller of the present invention, taken along line 2C—2C of FIG. 2.

As illustrated in FIG. 2C, flexible printed circuit 6 comprises a flexible substrate 17, a first set of Hall-effect type magnetic flux sensors 18A through 18E arranged on and mounted to the upper portion 17A of the substrate; a second set of Hall-effect type magnetic flux sensors 18F through 18H arranged on and mounted to the central portion 17B of the substrate; and a plurality of electrical conductors 19 which are connected to the first, and second sets of sensors and terminate in a multi-pin connector 20. The shape of flexible substrate 17 is selected so that upper portion thereof can be mounted within surface recess 14 of the cylindrical end portion of the lever, while the central portion of the flexible substrate is mounted on the flat central portion of the lever, as shown. When the flexible printed circuit is installed on the lever, as shown in FIGS. 2A and 2C, the lower portion thereof 6C extends in a ribbon-like fashion off and away from the lower portion of the lever, passes under lever support base 4A, and is connected to a matched connector on printed circuit board 21 in signal processing module 7, by way of multi-pin connector 20. In this way, reliable electrical connections are provided between the Hall-effect sensors on the shift lever and the signal processing module, as the lever is cyclically rotated to desired shifting positions by the operator. Suitable techniques for designing the flexible printed circuit employed in the controller of the present invention, are described in detail in the "Flexible Circuit Design Guide" (Second Edition) published by the Sheldahl, Inc. of Northfield, Minn.

As shown in FIG. 2A, a shift lever detent mechanism 22 is provided in order to releasable hold (i.e. detect) the lever anyone of its three, predetermined positions, (i.e. forward, neutral and reverse), selectable about rotational axis 9. In the illustrative embodiment, the shift lever detent mechanism comprises a spring loaded ball bearing 23 supported in a support bracket 24, and a set of three semi-spherical detents 25A, 25B and 25C formed in the flat control portion of the lever, opposite the Hall-effect sensors 18F, 18G and 18H, respectively. When the lever is rotated to the forward direction position F, ball bearing 23 will releasably engage detent 25C, disposed opposite Hall-effect sensor 18F. At the same time, cylindrically shaped magnet 27 supported on the interior wall of the housing, opposite spring loaded ball bearing 23, produces a narrow magnetic flux pattern which spatially intersects Hall-effect sensor 18F. Preferably, the dimensions of the magnetic flux pattern is designed so that only one Hall-effect sensor receives magnetic flux having a density sufficient cause it to produce a an electrical logical "1" output signal. In the present case, this would be to indicate that the lever has been shifted to the detented forward direction position F.

When the lever is rotatably shifted to the neutral direction position N, ball bearing 23 will then releasable engage detent 25B, disposed opposite Hall-effect sensor 26B. In response, Hall-effect sensor 18G will produce a logical "1" output signal to indicate that the lever has been shifted to the detented neutral position N. Similarly, when the lever is shifted to the reverse direction position R, ball bearing 23 will releasably engage detent 26A, disposed opposite Hall-effect sensor 18H. In response, Hall-effect sensor 18H will produce a logical "0" output signal to indicate that the lever has been shifted to the detented reverse direction position R. Whenever the shift lever is in transition between any of the three detented direction positions, it is possible, at particular instances in time, for two or more Hall-effect sensors to each a produce logical "1" output signal which will be transmitted over their respective conductors to the signal processing module. As will be described in greater detail hereinafter, inadvertent control signal generation is prevented in such instances by decoding logic utilized in the signal processing module. In this way, direction control signals are generated as output only when the shift lever is disposed at one of its three detented shift lever positions.

As best illustrated in FIGS. 2A and 2C, handle 5 is of the "twist-grip" type having a substantially cylindrical hollow interior cavity. When assembled, the handle is fitted over the upper cylindrical end portion of the lever and is free to rotate about a second axis of rotation 30, coaxial with longitudinal axis 9 of the lever. This is achieved by making the inner diameter of the handle cavity slightly greater than the outer diameter of upper cylindrical end portion of the lever. With the handle slid over the cylindrical portion of the lever, screw 31 is passed through aperture 32 in the end of the handle, and threaded into axial bore 33 formed in the center of the cylindrical end portion of the lever. With this fastening arrangement, the handle is securely attached to the lever, while any one of the five detented positions may be rotatably selected.

In the lower portion 5A of the handle, where the wall thickness is slightly greater than the upper portion thereof, a pair of spaced apart permanent magnets 35A and 35B of cylindrical geometry are fixedly mounted. As shown in FIG. 2C, the distance between these permanent magnets is equal to the distance between the upper pair of Hall-effect sensors 18A and 18B and the lower set of Hall-effect sensors 18C, 18D and 18E mounted within the surface recess of the cylindrical end portion of the shift lever.

In the illustrative embodiment, five detented rotational positions are provided over the range of rotational about second rotational axis 30, indicated by B. In the illustrative embodiment, this range B is about 50 degrees, although it is understood that it may vary from embodiment to embodiment. The five detented positions about the second rotational axis correspond to the five possible gear ratios G1, G2, G3, G4, G5 which may be selected by the operator by simply rotating the handle to corresponding detented position. In a manner similar to that provided to the lever, a handle detent mechanism 36 is provided preferably at the upper top end portion of the handle. As best shown in FIGS. 2A and 2C, the handle detent mechanism comprises five semispherical detents 37 formed in the end of the cylindrical portion of the shift lever, and a spring loaded ball bearing 38 retained within a recess 39 formed in the end portion of the handle. In the illustrative embodiment, semispherical detents 37 are spaced apart by a predetermined angular distance, which will vary depending upon the number of gear ratio selections desired in any particular embodiment of the invention.

The operation of the handle-actuated control selector is described as follows. When the handle is rotated to the gear ration position G1, the flux produced from permanent magnet 35B will be detected by the Hall-effect sensor 18C and its output will be a logical "1". When the handle is rotated to the gear ratio position G2, the magnetic flux produced by permanent magnet 35A will be detected by Hall-effect sensor 18A and its output will be a logical "1". When the handle is rotated to gear ratio position G3, the magnetic flux produced by permanent magnet 35B will be detected by Hall-effect sensor 18D and its output will be a logical "1". When the handle is rotated to gear ration position G45, permanent magnet 35A will be detected by Hall-effect by Hall-effect sensor 18B and its output will be a logical "1". Similarly, when the handle is rotated to gear ration position G5, the magnetic flux produced by permanent magnet 35B will be detected by Hall-effect sensor 18E. While the handle is being rotated between gear ratio positions, it is possible, even with the staggered arrangement of Hall-effect sensors illustrated in FIG. 2C, for two or more Hall-effect sensors to detect magnetic flux produced by the pair of permanent magnets in the handle. To prevent the output of erroneous control signals from the controller during such transitional stages of gear ratio selection, decoding logic represented in the Decode Table of FIG. 4 is used by the signal processing module.

As illustrated in the Decode Table, the logical output values produced by the Hall-effect sensors 18F, 18G, 18H, 18A, 18B, 18C, 18D and 18E are provided as input to the signal processing module as a parallel sequence of logical values, which are indicated in the Decode Table by HF, HN, HR, H1, H2, H3, H4 and H5, respectively. The logical output values of this decoding process are a sequence of logical values indicated in the table by OF, ON, OR, O1, O2, O3, O4, O5 and HLD. A logical "1" value for OF, ON or OR indicates that the forward, neutral or reverse direction has been selected by the hand-actuable shift lever, whereas a logical "1" value for O1, O2, O3, O4, or O5 indicates that gear ratio G1, G2, G3, G4 or G5 has been selected by the hand-actuable handle. A logical "1" for HLD indicates that all output control signals produced from the signal processing module, to the transmission, shall be withheld issue. Consequently, only for the sequences of logical input values, which have a logical "1" value for the HLD output bit, will a set of control signals be produced from the controller. As shown in the Decode Table, there are a total of fifteen valid sets of control signals which can be produced from the programmable controller of the illustrative embodiment of the invention. These fifteen sets of control signals correspond to five possible gear ratio selections in the forward direction, five possible gear ratio selections in the neutral direction, and five possible gear ratio selections in the reverse direction.

Figure 3:
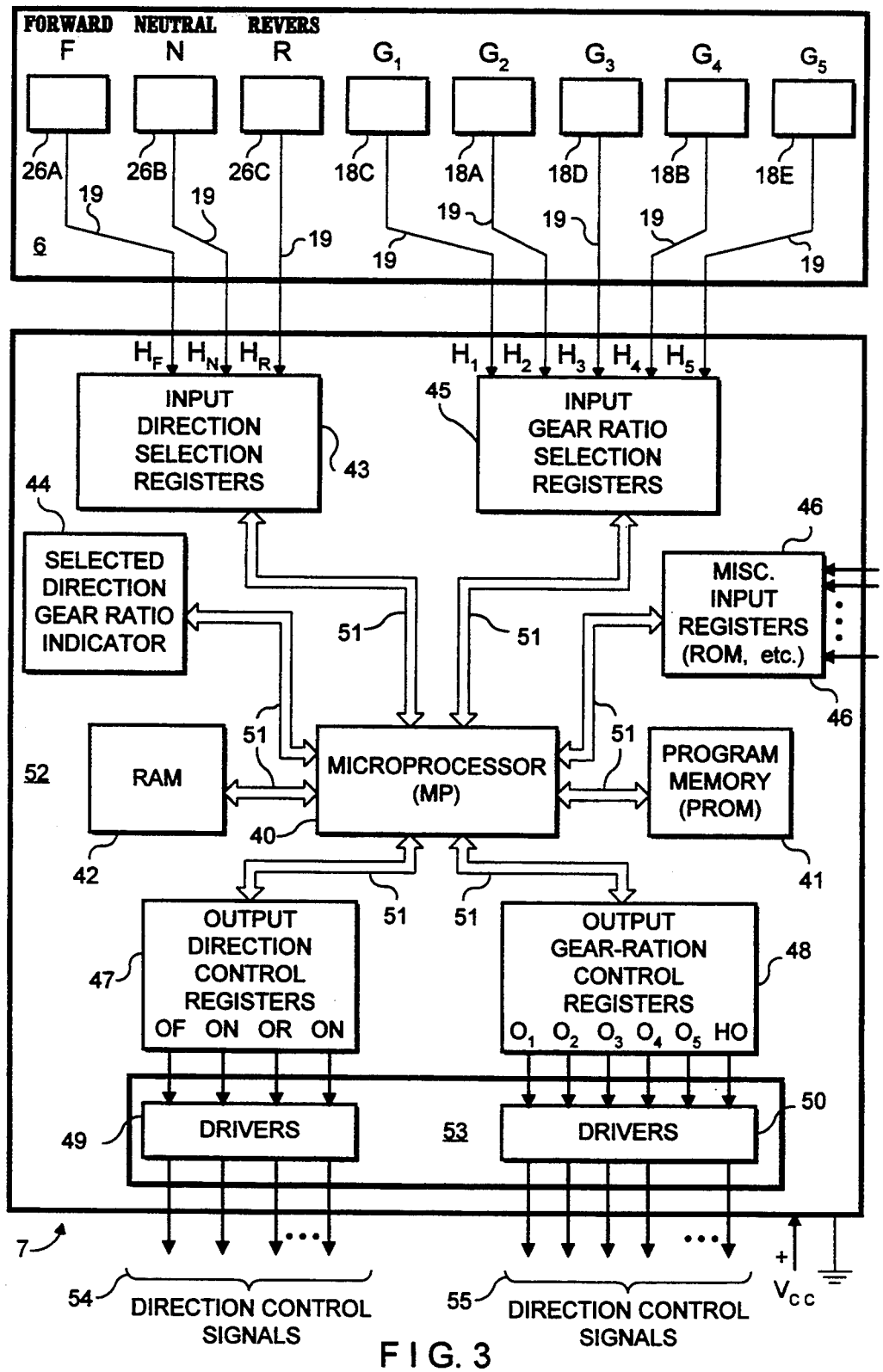
FIG. 3 is a schematic block diagram of the programmable controller of the present invention, illustrating the integration of the flexible printed circuit and electronic components in the signal processing module, which generate control signal within the compact housing of the controller.

In FIG. 3, the signal processing module of the programmable controller is schematically represented. As shown, signal processing module 7 comprises a number of components, namely: a processing unit (e.g a microprocessor) 40; a programmable memory storage device (e.g. PROM or EPROM) 41 for storing in microcode format a Transmission Control Program and the Decode Table of FIG. 4; random access memory 42 for temporary storage of data during the execution of the Transmission Control Program; input direction selection registers 43 for buffering the output values of Hall-effect sensors 18F, 18G, and 18H; an LCD 44 for displaying the direction and gear ratio selected by the operator; input gear ratio selection registers 45 for buffering the output values of Hall-effect sensors 18C, 18A, 18D, 18B, and 18E; miscellaneous input registers 46 for buffering output values of various sensors measuring parameters, such as engine RPM, vehicle speed etc.; output direction control register 47 for buffering logical signals produced by the processor relating to the direction selected by the operator; output gear ratio control registers 48 for buffering logical signals produced by the processor relating to the gear ratio selected by the operator; and driver circuits 49 and 50, for converting logical signals from registers 47 and 48, respectively, into suitable control signals particularly adapted for controlling a particular type of transmission. As shown, all of these components are operably associated with processor 40 by way of a bus 51, and are mounted on a printed circuit board 52 in a manner known in the art. Direct current (DC) electrical power is supplied to circuit board 52 in a conventional manner.

In order that the programmable controller is readily adaptable to control any type of transmission, driver circuits 49 and 50 are mounted on a separate printed circuit board or card 53. As shown in FIG. 3, this printed circuit board is electrically interfaced with the circuitry on printed board 52 by way of electrical plug connectors well known in the art. In this way, a solenoid driver circuits can be provided on a separate PC card and plugged into its connector on printed circuit board 52 when a solenoid-actuated transmission is to be controlled. Then, by programming PROM 41 with a suitable Transmission Control Program and establishing suitable interfaces with miscellaneous input registers 46, typically by way of a wire harness 53, the controller of the present invention is ready for controlling the operation of a solenoid-actuated transmission.

Alternatively, the operation of an electronically-controlled or data communication controlled transmissions can be controlled by the programmable controller of the present invention by plugging in a suitable driver card into its connector on printed circuit board 52, and then programming PROM 41 with a suitable Transmission Control Program.

During the operation of the programmable controller, processor 40 periodically performs a series of basic operations under the control of the Transmission Control Program. Specifically, the processor reads the data stored in registers 43 and 45 and utilizes the Decode Table of FIG. 4 to decode the direction and gear ratio signals produced from the Hall-effect sensors on the hand-actuable lever. Then, depending on the type of transmission being controlled, the process or will read the data stored in miscellaneous input registers 46. Then, after performing a sequence of computations and buffering the results in RAM 42, the processor writes a sequence of logical values into the output direction and gear ratio control registers 47 and 48. These logical values are automatically converted into a set of direction control signals 54 and a set of gear ratio control signals 55, which are provided to the transmission. At the same time, the process or visually displays on LCD 44, graphical indica representative of the direction and gear ratio selected by the operator. The above process is repeated a number of times per second in order to supply the transmission with updated control signals selected by the operator.

Figure 5:
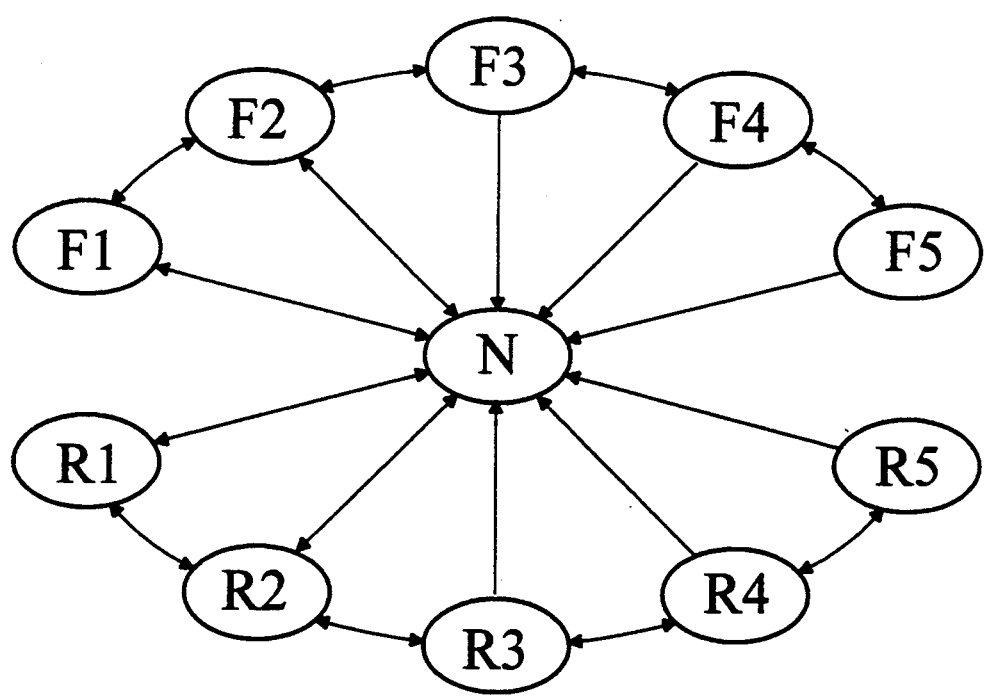
FIG. 5 is a state transition diagram illustrating the transitions in directions and gear ratio selections permitted by the illustrative embodiment of the programmable controller of the present invention.

In FIG. 5, a state transition diagram is provided for the programmable controller of the illustrative embodiment. As shown, the controller may produce control signals for the various directions and gear ratios selected by the operator. Permissible transitions in the production of such control signal sets are indicated by the directional arrows presented in the state transition diagram. It is understood that this diagram represents permissible state transitions in the programmable controller of the illustrative embodiment, and that other permissible state transitions may be provided by suitably programming the controller.

Figure 6A:
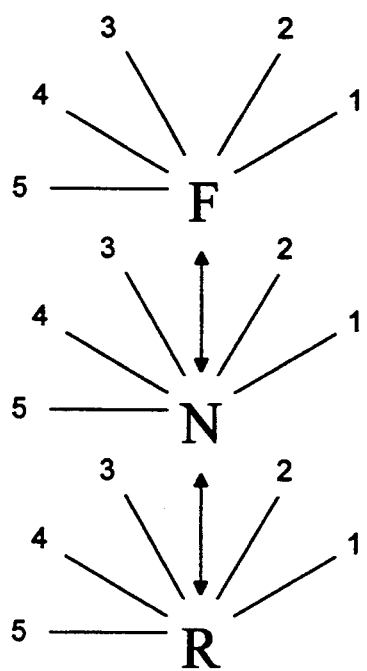
FIG. 6A is a schematic representation of the physical shifting pattern provided by the programmable controller of illustrative embodiment of the present invention.
Figure 6B:
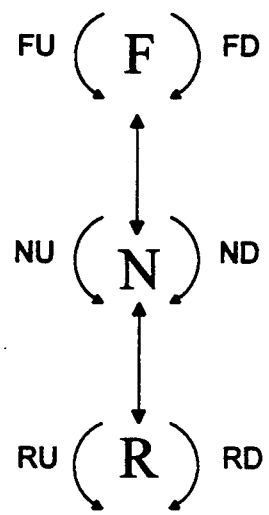
FIG. 6B is a schematic representation of the physical shifting pattern provided by the programmable controller of alternative embodiment of the present invention.

FIG. 6A provides a schematic representation of the physical shifting pattern provided by the detented handle embodiment of the programmable controller described above. In an alternative embodiment schematically illustrated in FIG. 6B, a spring-biased "bump-type" shift mechanism can be provided to the handle so that it has two selectable positions, namely: a clockwise directed "upshift" position indicated in FIG. 6B by FU, NU and RU when at directions F, N and R, respectively; and a counter-clockwise directed "downshift" position indicated in FIG. 6B by FD, ND and RD when at directions F, N and R, respectively. In this alternative embodiment, Hall-effect sensors 18A and 18B are not utilized, while sensors 18C and 18E are used to sense the above-described upshift and downshift positions, respectively. Hall-effect sensors 18D is used to sense the "rest" position, to which the spring biased handle automatically returns when released by the hand of the operator. Preferably, the spring-biased handle return mechanism is installed in the top end portion of the handle, in a manner known in the art. In this embodiment, a suitable Decode Table and transmission control program will be set in PROM 41. In order to incrementally upshift or downshift the gear ratios, the operator simply rotates the handle clockwise or counter-clockwise independent of the position of the shift lever about axis 13.

While the particular embodiments shown and described will be useful in many applications in the hand-actuable controller art, further modifications of the present invention will occur to persons skilled in this art. All such modifications are deemed to be within the scope and spirit of the present invention defined by the appended claims.

What is claimed is:

1. A hand-actuatable controller for producing a control signal for use in controlling the operation of equipment in a work or recreational environment, comprising:

a housing supportable at a desired location in said environment;

a lever having a longitudinal extent and extending from said housing;

a handle member disposed along at least a portion of the longitudinal extent of said lever, graspable by the hand of an operator, and rotatable about an axis of rotation over a predetermined range of rotational positions;

a flexible substrate mounted on at least a portion of said lever and having at least a selected portion disposed between said lever and said handle member;

sensing means for sensing the rotational position of said handle member about said axis of rotation, said sensing means including a magnetic flux producing means disposed in said handle member, for producing a pattern of magnetic flux in the vicinity of said lever, a plurality of magnetic flux sensors, each said magnetic flux sensor being supported on said selected portion of said flexible substrate and being separated from adjacent magnetic flux sensors by a predetermined distance and capable of detecting magnetic flux produced from said magnetic flux producing means as said handle member is rotated about said axis of rotation, and producing an electrical signal indicative of the detected magnetic flux, and a plurality of electrical conductors supported on said flexible substrate and being connected to said plurality of magnetic sensors; and control signal producing means, operably connected to said plurality of electrical conductors, for receiving the electrical signals produced from said plurality of magnetic flux sensors, and producing a control signal indicative of the rotational position of said handle member about said axis of rotation, wherein said produced control signal is suitable for use in controlling the operation of said equipment in a work or recreational environment.

2. The hand-actuatable controller of claim 1, wherein said control signal producing means further comprises signal analyzing means for analyzing the electrical signals produced from said plurality of magnetic flux sensors so as to determine the rotational position of said handle member about said axis of rotation and automatically produce said control signal.

3. The hand-actuatable controller of claim 1, wherein said magnetic flux producing means comprises a permanent magnet, and each said magnetic flux sensor comprises a Hall-effect type magnetic flux sensor.

4. The hand-actuatable controller of claim 1, wherein said control signal producing means comprises signal conversion means for converting said electrical signals into digital signals, and a programmed microprocessor for analyzing said digital signals, and producing said control signal.

5. The hand-actuatable controller of claim 1, wherein said lever further comprises a recessed groove formed in a surface portion of said lever between said handle member and said lever, and said selected portion of said flexible circuit is mounted within said recessed groove.

6. The hand-actuatable controller of claim 5, wherein said magnetic flux producing means comprises said permanent magnet disposed in said handle member.

7. The hand-actuatable controller of claim 1, wherein said control signal producing means is disposed within said housing.

8. A hand-actuatable controller for producing control signals for use in controlling the operation of equipment in a work or recreational environment, comprising:

a housing supportable at a desired location in said environment;

a lever having a longitudinal extent and disposed in at least a portion of said housing, and being rotatable about a first axis of rotation over a first predetermined range of rotational positions;

a handle member disposed along at least a portion of the longitudinal extent of said lever, graspable by the hand of an operator, and rotatable about a second axis of rotation over a second predetermined range of rotational positions;

a flexible substrate mounted on at least a portion of said lever and having at least a selected portion disposed between said lever and said handle member;

first sensing means for sensing the rotational position of said lever about said first axis of rotation, said first sensing means including a first magnetic flux producing means mounted in said housing, for producing a pattern of magnetic flux in the vicinity of said lever, a first plurality of magnetic flux sensors, each said magnetic flux sensor in said first plurality of magnetic flux sensors being supported on a portion of said flexible substrate and being separated from adjacent magnetic flux sensors by a predetermined distance and capable of detecting magnetic flux produced from said first magnetic flux producing means as said lever is rotated about said first rotational axis, and producing an electrical signal indicative of the detected magnetic flux, and a first plurality of electrical conductors supported on said flexible substrate and being connected to said first plurality of magnetic sensors;

second sensing means for sensing the rotational position of said handle member about said second axis of rotation, said second sensing means including a second magnetic flux producing means disposed in said handle member, for producing a pattern of magnetic flux in the vicinity of said handle member, a second plurality of magnetic flux sensors, each said magnetic flux sensor in said second plurality of magnetic flux sensors being supported on said selected portion of said flexible substrate and being separated from adjacent magnetic flux sensors by a predetermined distance and being capable of detecting magnetic flux produced from said second magnetic flux producing means as said handle member is rotated about said second axis of rotation, and producing an electrical signal indicative of the detected magnetic flux, and a second plurality of electrical conductors supported on said flexible substrate and connected to said second plurality of magnetic flux sensors; and control signal producing means, operably connected to said first and second plurality of electrical conductors, for receiving the electrical signals produced from said first and second plurality of magnetic flux sensors, and producing a first control signal indicative of the rotational position of said lever about said first axis of rotation, and producing a second control signal indicative of the rotational position of said handle member about said second axis of rotation, wherein said produced first and second control signals are suitable for use in controlling the operation of said equipment in a work or recreational environment.

9. The hand-actuatable controller of claim 8, wherein said control signal producing means further comprises signal analyzing means for analyzing the electrical signals produced from said first plurality of magnetic flux sensors so as to determine the rotational position of said lever about said first axis of rotation and automatically produce said first control signal, and for analyzing the electrical signals produced from said second plurality of magnetic flux sensors so as to determine the rotational position of said handle member about said second axis of rotation and automatically produce said second control signal.

10. The hand-actuatable controller of claim 8, wherein said first magnetic flux producing means comprises a first permanent magnet, said second magnetic flux producing means comprises a second permanent magnet, and each said magnetic flux sensor in said first plurality of magnetic flux sensors and said second plurality of magnetic flux sensors comprises a Hall-effect type magnetic flux sensor.

11. The hand-actuatable controller of claim 8, wherein said control signal producing means comprises signal conversion means for converting said electrical signals into digital signals, and a programmed microprocessor for analyzing said digital signals, and producing said first and second control signals.

12. The hand-actuatable controller of claim 8, wherein said lever further comprises a recessed groove formed in a surface portion of said lever between said handle member and said lever, and said selected portion of said flexible circuit is mounted within said recessed groove.

13. The hand-actuatable controller of claim 12, wherein said second magnetic flux producing means comprises a permanent magnetic disposed in said handle member.

14. The hand-actuatable controller of claim 8, wherein said control signal producing means is disposed within said housing.

* * * * *